July 15, 1941.  E. A. DOUBET  2,248,922

PLANTING MACHINE

Filed June 10, 1940  2 Sheets-Sheet 1

INVENTOR.
ELMER A. DOUBET
BY  J. Ledermann, Atty.

July 15, 1941.  E. A. DOUBET  2,248,922
PLANTING MACHINE
Filed June 10, 1940  2 Sheets-Sheet 2
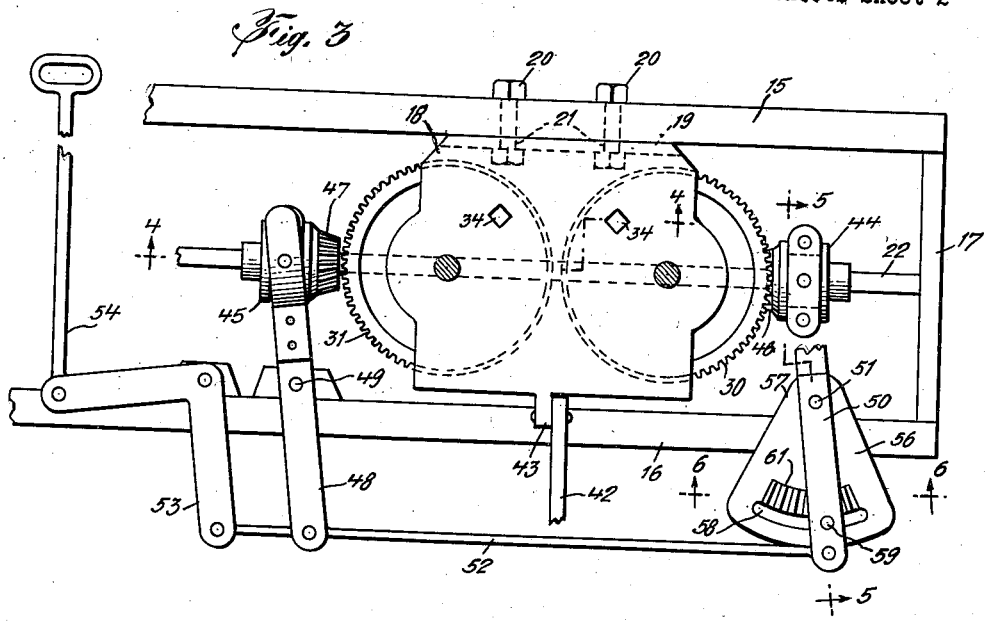
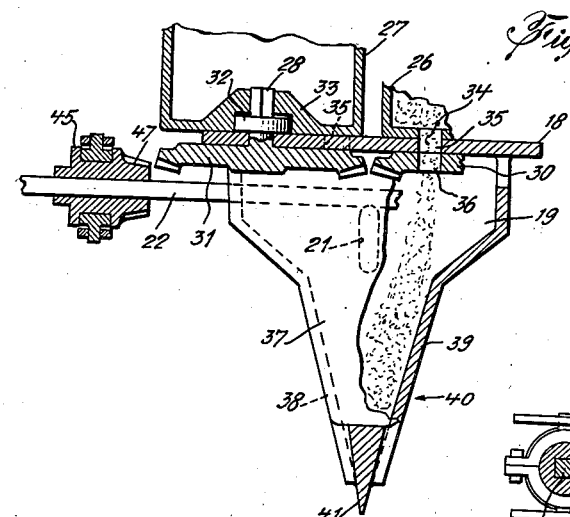
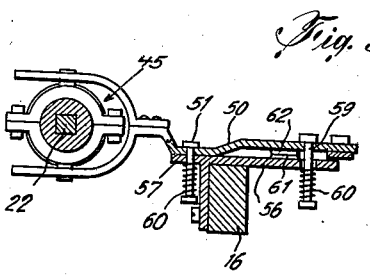
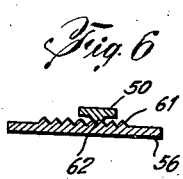
INVENTOR.
ELMER A. DOUBET
BY F. Ledermann, Atty.

Patented July 15, 1941

2,248,922

UNITED STATES PATENT OFFICE 2,248,922

PLANTING MACHINE

Elmer A. Doubet, Hanna City, Ill.

Application June 10, 1940, Serial No. 339,656

6 Claims. (Cl. 111—35)

This invention relates to corn planters, and aims to provide various time saving and labor saving improvements for the use of such machines for planting parent and inbred corn for the purpose of crossing the corn to raise hybrid seed corn, as set forth below. When raising hybrid seed corn, two kinds of corn seeds are used, and in using planters of the present type provided with a single planter box to each runner, the seed must be changed in the boxes, for seed raisers desire to plant four rows of parent seed to one row of inbred seed. The consequently necessary changing of seed in the planter boxes takes up as much as fifty percent of the planting time expended.

This invention aims to provide two planter boxes to the runner, so that changing of the seed in the boxes is eliminated with the consequent saving of time and labor, as one type of seed is placed in one box and the other type in the other box. Means is provided, connected with a lever at ready access to the operator, whereby a change of seed being planted is accomplished by the mere operation of this lever to disconnect one of the boxes and to actuate the other, thus shutting off the dropping of seeds from the first box and starting the dropping of seeds from the second. The operation of the lever is practically instantaneous and may be accomplished without interruption of the movement of the vehicle.

A further object of the invention is the provision of adjustable means for varying the number of seeds dropped per unit of distance traveled by interchanging or varying the size of gears forming a part thereof, and furthermore to provide means for releasably and positively locking the lever and its associated parts in position that the operation of the boxes can not be interchanged excepting upon positive movement of the lever by the operator.

The above and other objects will become apparent in the description below, reference being had to the accompanying drawings which form a part hereof but serve merely to illustrate one manner in which the objects of the invention may be attained without intending in any manner to limit the invention to the particular details illustrated.

Referring briefly to the drawings,

Figure 3 is a cross-sectional view taken on the line 3—3 of Figure 2.

Figure 4 is a cross-sectional view taken on the line 4—4 of Figure 3.

Figure 5 is a cross-sectional view taken on the line 5—5 of Figure 3.

Figure 6 is a cross-sectional view taken on the line 6—6 of Figure 3.

Figure 1:
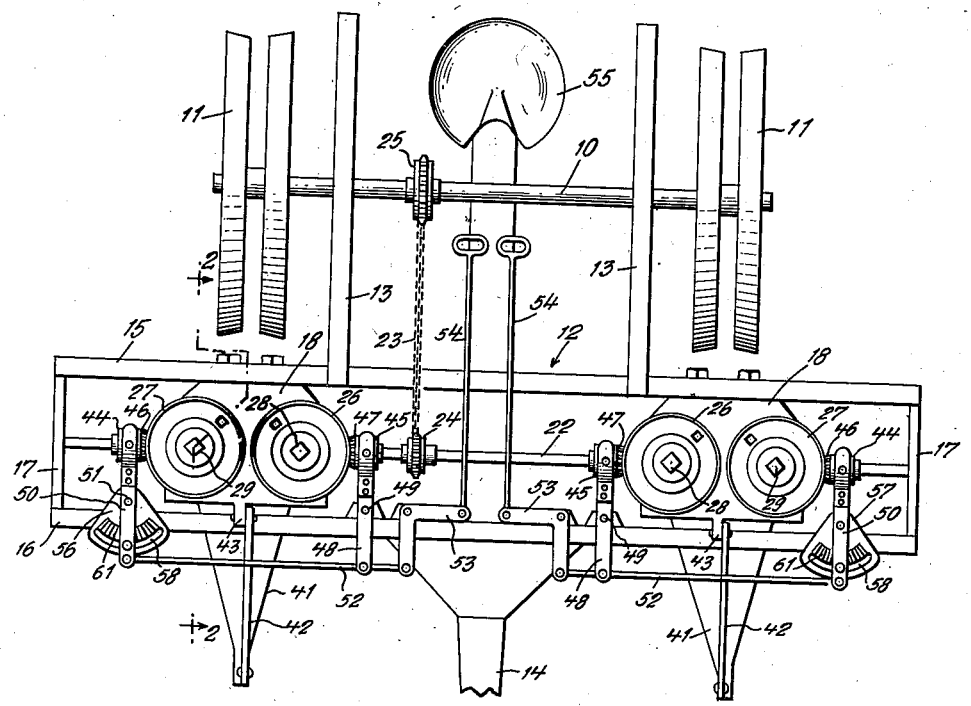
Figure 1 is a plan view of the planter, which is adapted to be hitched to a tractor or drawn by horses.

Referring in detail to the drawings, the numeral 10 indicates the axle or shaft of a planting machine to which the wheels 11 are fixed, so that the axle is rotated by the wheels when the vehicle is in motion. The cross frame 12 of the planter is supported at the rear by a pair of spaced beams 13 through which the axle 10 passes rotatably, and at the front by the tongue 14, by means of which the vehicle is drawn. The frame 12 comprises a pair of spaced transverse beams 15 and 16, joined at their ends by end pieces 17.

A horizontal plate 18 substantially bridges the space between the transverse beams 15 and 16, and is secured by bolts 20 to the rear beam 15 through the medium of a depending apron 19 integral with the plate 18. A vertical slot 21 is formed in the apron 19, and the bolt 20 passes therethrough; thus, the apron and consequently the plate 18 may be raised or lowered within the range permitted by the length of these slots, with respect to the frame 12.

A transverse shaft 22, square in cross-section, is rotatably supported in the end pieces 17 of the frame 12, and is actuated by a chain 23 in mesh with a cog 24 thereon and with a cog 25 on the axle 10. It is to be noted that there are two plates 18, one on each side of the frame 12, and as these plates and their associated parts above described and further to be described below, are identical to each other, the detailed description is applied to but one such unit.

Figure 2:
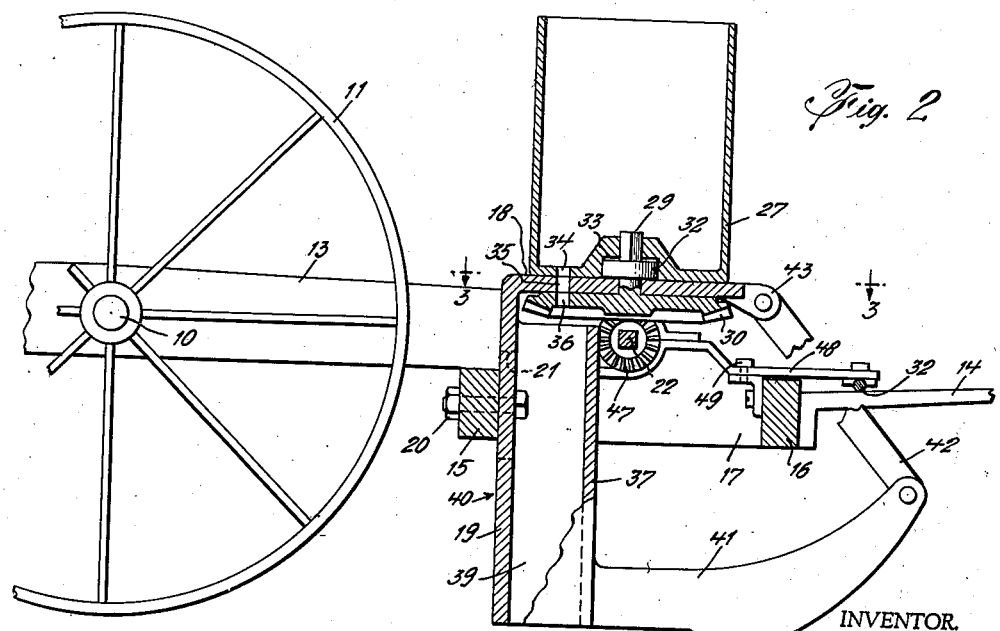
Figure 2 is a cross-sectional view taken on the line 2—2 of Figure 1.

On the plate 18 a pair of seed boxes 26 and 27 are mounted in transversely spaced relation, and are rotatably supported on stub shafts 28 and 29, square in cross-section, extending upward from bevel gears 30 and 31. The intermediate portions of the stub shafts 28 and 29 are cylindrical, and have collars 32 thereon which rest rotatably on the plate 18. The seed boxes have bosses 33 on their bottoms in which the collars 32 register, the opening through the bottom of the box, or the top of the boss 33, being square so that, although they may be readily lifted up off the plate 18, they are rotated by the stub shafts when they rest on the plate. Each seed box has an opening 34 positioned eccentrically, through its bottom, and for each box there is a similarly-positioned opening 35 through the plate 18, and further, a similarly positioned opening 36 through the gear 30 or 31. Since the gear 30 and the box 26, as well as the gear 31 and its box 27, turn synchronously, it is apparent that their openings 36 and 34 are always in vertical alignment, and when these openings become aligned with the plate opening 35, there will be a clear vertical passage through the box, plate and gear, as shown in Figure 2.

The apron 19 forms the rear wall of a depending substantially funnel-shaped runner which is substantially rectangular in horizontal cross-section, and has its front wall at 37 and its side walls at 38 and 39, the runner being generally indicated by the numeral 40. Integral with the front wall 37 of the runner and projecting forward therefrom is the plow or furrower 41. At its forward end the member 41 is joined by a link 42 with an ear 43 on the plate 18. One such runner 40 is positioned under each pair of boxes 26 and 27.

Mounted slidably on the shaft 22, are a pair of oppositely disposed clutches 44 and 45, provided with bevel pinions 46 and 47, respectively, which have square openings, as shown; the pinion 46 being adapted to mesh with the gear 30, and the pinion 47 with the gear 31. The clutch 44 is slid back and forth by an arm 50 pivoted at 51 to the frame. The clutch 45 is operated by an arm 48 similarly pivoted at 49. The arms 48 and 50 are always mutually parallel, so that as one clutch is slid to engage its pinion with the adjacent gear, the other clutch automatically and simultaneously is slid to disengage its pinion from its adjacent gear; thus, either one or the other of the two seed boxes 26 and 27 may be set to rotate selectively, but both cannot rotate simultaneously, and one starts to rotate the moment the other has stopped.

At their free ends, the clutch arms 48 and 50 are pivoted to a rod 52 which at one end is pivoted to a bell crank 53. The other end of the bell crank is pivoted in the end of a rod 54 provided with a handle and situated close to the driver's seat 55. The frame 12 is provided with ears 57, to which the clutch arms 50 are pivoted to the frame and which themselves form integral parts of notched plates 56 bolted to the frame beam 16, as shown in Figure 5. An arcuate concentric slot 58 in the plate 56 has a pin 59, projecting from the arm 50, riding therein. Coiled springs 60 tend to keep the arm 50 close against the plate 56. The upper surface of the plate is provided with a plurality of radial notches 61, in any one of which a tongue 62 on the underside of the arm 50 may yieldably register by virtue of the tension of the springs 60. When in neutral position, as shown in Figure 1, the levers 54 are ready to be operated by either pushing or pulling, and in this position the arms 50, which here also serve as dials, are positioned midway of the slots 58. When one of the rods 54, say, for example, the right-hand rod 54, is pushed forward by the driver, the front ends of the clutch arms 48 and 50 on that side are swung to the right, thereby engaging the pinion 46 with the gear 30 and rotating box 27; the arm 50 will have been swung toward the right-hand end of the slot 58, and the position of the arm 50 in the slot 58 will be indicated by the number, not shown, marked on that notch. The operator can always tell that the proper engagement between pinion and gear has been made by noting that the arm 50 is in the proper notch on the dial. Then, when he wishes to bring box 27 to a stop and start box 26, he pulls the rod 54 back until the pinion 46 is disengaged from the gear 30 and the pinion 47 is engaged with the gear 31, and again the new position of the arm 50 in the slot 58 will be observable by the number of the notch at which it has stopped. Once graduated and calibrated, the operator will remember the proper notch number for each operating position of the levers.

The size of the clutch pinion 47 determines the number of grains or seeds planted per unit of length traveled; to vary this number, the pinions 47 and 46 are replaced by smaller or larger ones; if by smaller, the number of seeds per unit of travel is reduced, and vice versa.

The complete operation of the device is now believed apparent. The two units shown, one on each side of the frame, each comprising two seed boxes 26 and 27 and all their associated and operating parts including one rod 54, are mere duplications of each other and each is operated individually. If desired, only one such set or unit may be provided instead of the two units shown, or any number more than the two shown may be provided.

Assuming that the boxes 27 contain one kind of grain and the boxes 26 another kind, and the device is proceeding along its way dropping or planting seeds from the boxes 27, both rods 54 will be in pushed-forward position, as is that shown in Figure 3. Thus, pinions 47 will be running idle and pinions 46 will be engaged with their gears 30. Boxes 27 will thus be rotating, and once during each rotation the openings 34—35—36 will become aligned and a seed will fall into the runner 40 and out of the same into the furrow left behind the member 41. When it is desired to change the kinds of seeds in the two furrows, both rods are pulled back into the positions previously mentioned, disengaging the pinions 46 and engaging the pinions 47 with their gears 31, thus stopping the boxes 27 and starting rotation of the boxes 26.

It is apparent from the above, and without requiring further emphasis, that the improvements provided result in a corn planter which efficiently plants two kinds of seed exactly in the order and proportion desired, with a substantial saving in both time and labor, in that it is unnecessary to stop to replace a seed box with another kind of seed. The planting is carried on as a continuous operation once the boxes have each been filled with the proper seed, and the operator need not stop his vehicle until his job is done or until all his seed boxes are empty.

Obviously, modifications in form and structure may be made without departing from the spirit and scope of the invention.

I claim:

1. In a planter comprising a frame, a shaft supported in said frame and having traction wheels rigid thereon, a pair of spaced seed boxes rotatably mounted on said frame, each of said boxes having an opening through the bottom thereof off-set from the center, horizontal bevel gears mounted on said frame and each having one of said boxes rigidly secured thereto to rotate synchronously therewith, each of said gears having an opening therethrough in alignment with said box opening, said frame having two openings therethrough, one for each of said boxes, each of said frame openings being positioned in the orbit of its adjacent box opening, a shaft rotatably mounted in said frame, means connecting said first-named and second-named shafts for rotating the latter upon rotation of said wheels, bevel pinions loosely mounted on said second-named shaft, said second-named shaft being square in cross-section and said bevel pinions having square openings therethrough through which said shaft passes, and means for alternately engaging one of said pinions with one of said gears and simultaneously disengaging the other of said pinions from the other of said gears.

2. In a planter having a pair of rotatable seed boxes thereon provided with means for dropping seeds therefrom at spaced intervals during the travel of the planter, means connected with the wheels of the planter for rotating said boxes, and means for alternately engaging said rotating means with either of said boxes and simultaneously disengaging the same from the other.

3. In a planter having a pair of seed boxes rotatably mounted thereon, means for rotating said boxes during travel of the planter, means for dropping seeds from said boxes at spaced intervals during said travel, and means for alternately disengaging said rotating means from one of said boxes and engaging the same with the other of said boxes.

4. In a planter having a pair of seed boxes rotatably mounted thereon, rotating means for said boxes connected with the planter wheels and actuated thereby during travel of the planter, means for dropping seeds from the boxes at intervals during the rotation thereof, and means for alternately disengaging said rotating means from one of said boxes and engaging the same with the other of said boxes.

5. In a planter comprising a frame, an axle rotatably mounted in said frame and having rigid wheels thereon supporting said frame, a plate secured to said frame and having a runner thereunder, a pair of seed boxes rotatably mounted on said plate above said runner, rotating means actuated by said axle and adapted to rotate said boxes, openings in boxes and said plate adapted to be aligned once during each rotation of said boxes to drop a seed into said runner, and means for alternately disengaging said rotating means from one of said boxes and simultaneously engaging the same with the other of said boxes.

6. In a planter comprising a frame, an axle rotatably mounted therein and having traction wheels rigid thereon, a plate mounted horizontally on said frame and having openings therethrough, each of said boxes having a horizontal gear rigid therewith and positioned under said plate, openings in the bottoms of said boxes, openings through said gears, said openings through each box and its gear being in vertical alignment, said plate openings lying in the orbits of said box and gear openings, rotating means connected with and operated by said axle, and means for alternately connecting said rotating means with one of said gears and simultaneously disconnecting the same from the other of said gears.

ELMER A. DOUBET.